United States Patent [19]

Inoue et al.

[11] Patent Number: 4,880,078
[45] Date of Patent: Nov. 14, 1989

[54] EXHAUST MUFFLER

[75] Inventors: Takeshi Inoue; Hiroshi Funabashi, both of Saitama; Yukihiro Nakagawa, Aichi, all of Japan

[73] Assignees: Honda Giken Kogyo Kabushiki Kaisha, Tokyo; Nakagawa Sangyo Co., Ltd., Aichi, both of Japan

[21] Appl. No.: 213,014

[22] Filed: Jun. 29, 1988

[30] Foreign Application Priority Data

Jun. 29, 1987 [JP] Japan ................. 62-161484
Jun. 29, 1987 [JP] Japan ................. 62-161485
Jun. 29, 1987 [JP] Japan ............. 62-99865[U]
Apr. 27, 1988 [JP] Japan ................. 63-105188

[51] Int. Cl.$^4$ .......................... F01N 1/10; F01N 7/02; F01N 7/14; F01N 7/18
[52] U.S. Cl. ................................ 181/232; 181/227; 181/246; 181/249; 181/252; 181/256; 181/282
[58] Field of Search ............... 181/227, 232, 233, 244, 181/246, 249, 250, 252, 282, 256

[56] References Cited

U.S. PATENT DOCUMENTS

| 2,065,232 | 12/1936 | MacKenzie et al. | 181/232 |
| 2,233,804 | 3/1941 | Bourne | 181/233 |
| 4,213,414 | 7/1980 | Sato et al. | 181/282 X |
| 4,589,516 | 5/1986 | Inoue et al. | 181/256 |

FOREIGN PATENT DOCUMENTS

| 59-155528 | 9/1984 | Japan . |
| 60-108514 | 6/1985 | Japan . |
| 60-175717 | 9/1985 | Japan . |
| 60-175721 | 9/1985 | Japan . |
| 60-206920 | 10/1985 | Japan . |
| 60-206921 | 10/1985 | Japan . |
| 60-206927 | 10/1985 | Japan . |
| 61-252822 | 11/1986 | Japan . |

Primary Examiner—B. R. Fuller
Attorney, Agent, or Firm—Armstrong, Nikaido, Marmelstein, Kubovcik & Murray

[57] ABSTRACT

An exhaust muffler for use with an internal combustion engine has at least one internal suppression chamber, at least one inlet pipe for receiving exhaust gases from the internal combustion engine, and at least one outlet pipe vented to atmosphere. The exhaust muffler comprises a plurailty of component units connected in series with each other and each having the internal suppression chamber. Each of the component units has a casing having an inner layer of a sound-absorbing material which defines the internal suppression chamber, and a connector pipe connected to and extending through the casing, the connector pipe having upstream and downstream ends projecting out of the casing, the connector pipe having at least one opening which opens into the internal suppression chamber. At least one of the component units is constructed to meet:

$$\sqrt{(S/l \cdot V)} < 500\pi/C$$

where V is the volume of the internal suppression chamber, l and S are the effective pipe length of and cross-sectional area of a flow passage in the main exhaust pipe extending from the internal suppression chamber of the at least one of the component units to one of the internal suppression chamber of the next component unit and the end vented to atmosphere, and C is the speed of sound.

6 Claims, 6 Drawing Sheets

EXHAUST MUFFLER

BACKGROUND OF THE INVENTION

1. Field of the Invention:

The present invention relates to a muffler to be connected to the exhaust outlet of an internal combustion engine for attenuating exhaust noise and vibration.

2. Description of the Relevant Art:

Conventional mufflers coupled to the exhaust outlet of internal combustion engines have a casing which defines therein an expansion or resonance chamber for dampening acoustic energy to deaden exhaust noise. Such exhaust mufflers are disclosed in Japanese Laid-Open Patent Publications Nos. 60-206921, 60-175721, and 60-206927.

The muffler with an expansion chamber disclosed in Japanese Laid-Open Patent Publication No. 60-206921 comprises an outer casing made of a molded sound-absorbing material and inner structural members such as an exhaust inlet pipe and an exhaust outlet pipe which are coupled to the outer casing, the inner structural members being unitary in structure. The outer casing defines therein an inner expansion chamber for dampening the noise of exhaust gases introduced from the exhaust manifold of the internal combustion engine. The expansion-type muffler can attenuate exhaust noise by selecting the cross-sectional area of the expansion chamber to be larger than that of the exhaust inlet pipe.

The inner expansion chamber of the expansion-type mufflers, including not only the one disclosed in the Japanese Laid-Open Patent Publication No. 60-206921 but also other expansion-type mufflers, has a volume which is usually about 5 to 6 times larger than the displacement of the internal combustion engine to which the muffler is connected. Therefore, the outer casing is large in diameter and a large space is needed to install the muffler therein. As a result, the position where the muffler is located and the positions where other accessories are disposed around the engine are subjected to limitations.

Japanese Laid-Open Patent Publication No. 59-155528 shows another muffler having an outer casing made of glass wool compressed to shape and having a hardened outer surface impregnated with heat-resistant resin. The outer casing has an expansion chamber for expanding exhaust gases to dampen exhaust noise in a low-frequency range. Exhaust noise in a high-frequency noise is absorbed and attenuated by the glass wool on the inner surface of the outer casing.

This muffler is also disadvantageous since the expansion chamber requires a large volume in order to effectively dampen the low-frequency exhaust noise.

The present invention has been made in an effort to effectively circumvent the aforesaid problems of the conventional exhaust mufflers.

SUMMARY OF THE INVENTION

It is an object of the present invention to provide an exhaust muffler which is small in size, can effectively attenuate exhaust noise, and does not impose limitations on the position where the exhaust muffler is located and the positions where other accessories are disposed around an internal combustion engine to which the exhaust muffler is coupled.

Another object of the present invention is to provide an exhaust muffler which is of small size and capable of effectively attenuating exhaust noise in high- and low-frequency ranges.

To achieve the above objects, there is provided in accordance with the present invention an exhaust muffler having at least one internal suppression chamber, at least one inlet pipe for receiving exhaust gases from an internal combustion engine, and at least one outlet pipe vented to atmosphere, the exhaust muffler comprising:

a plurality of component units connected in series with each other;

each of the component units having a casing defining the internal suppression chamber therein and having an inner layer of a sound-absorbing material which defines the internal suppression chamber, and a connector pipe coupled to the casing and extending through the internal suppression chamber, the connector pipe having upstream and downstream ends projecting out of the casing;

the connector pipe having at least one opening which opens into the internal suppression chamber;

the connector pipes of the component units having downstream and upstream ends connected successively to hold the internal suppression chambers of the component units in communication in series with each other;

the connector pipe of most upstream one of the component units having an upstream portion serving as said at least one inlet pipe; and the connector pipe of most downstream one of the component units having a downstream end vented to atmosphere.

The connector pipes of the component units jointly serve as a single main exhaust pipe. At least one of the component units being constructed to meet:

$$\sqrt{(S/l \cdot V)} < 500\pi/C$$

where V is the volume of the internal suppression chamber, l and S are the effective pipe length of and cross-sectional area of a flow passage in the main exhaust pipe extending from the internal suppression chamber of the at least one of the component units to one of the internal suppression chamber of the next component unit and the end vented to atmosphere, and C is the speed of sound.

The above and further objects, details and advantages of the present invention will become apparent from the following detailed description of preferred embodiments thereof, when read in conjunction with the accompanying drawings.

DESCRIPTION OF THE PREFERRED EMBODIMENTS

Figure 1:
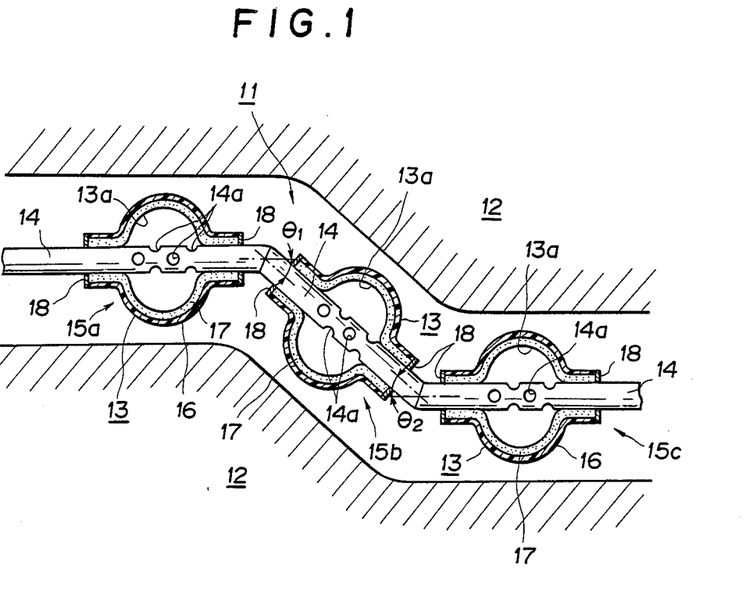
FIG. 1 a cross-sectional view of an exhaust muffler according to a preferred embodiment of the present invention.

As shown in FIG. 1, an exhaust muffler 11 according to a preferred embodiment of the present invention comprises a plurality of component units 15 connected in series with each other, i.e., three component units 15a, 15b, 15c in the illustrated embodiment. The muffler 11 is mounted on a frame 12 of a motor vehicle (not shown).

Figure 2:
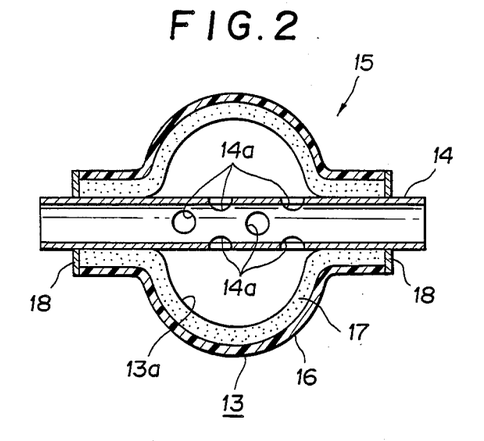
FIG. 2 is a cross-sectional view of a component unit of the exhaust muffler.

As shown in FIG. 2, each component unit 15 comprises a substantially spherical box or casing 13 with a spherical suppression chamber 13a, and a pipe 14 extending through the casing 13 at its center.

The casing 13 has a laminated structure having an outer layer 16 made of molded sound-absorbing material which is hard and highly rigid, and an inner layer 17 made of an absorbing material which is soft. For example, the outer layer 16 is made of fiber-reinforced plastic (FRP) comprising inorganic heat-resistant fibers such as glass wool, rock wool, or the like impregnated with thermosetting resin such as unsaturated polyester or the like. The inner layer 17 is made of inorganic fibers of the type described above which are compressed to shape. However, the inner layer 17 may be of porous resin which is formed by impregnating heat-resistant resin in the inorganic fibers and partly setting the heat-resistant resin. The pipe 14 has opposite ends extending out of the casing 13 and fixed to the casing 13 by means of respective end plates 18. The pipe 14 has an intermediate portion disposed in the suppression chamber 13a and having a plurality of holes 14a defined therein.

The pipe 14 of the most upstream component unit 15a (shown as the leftmost one in FIG. 1) has its upstream end connected to the exhaust manifold of an internal combustion engine (not shown). The downstream end of the pipe 14 of the component unit 15a is welded or otherwise connected to the upstream end of the pipe 14 of the intermediate component unit 15b, and the downstream end of the pipe 14 of the intermediate component unit 15b is joined to the upstream end of the pipe 14 of the most downstream component unit 15c (shown as the rightmost one in FIG. 1). The downstream end of the pipe 14 of the component unit 15c is vented to atmosphere. The pipes 14 of the component units 15a, 15b, 15c serve as inlet, connector, and outlet pipes, respectively. The pipes 14 are joined to each other at angles $\theta 1$ and $\theta 2$ which are suitably selected.

Exhaust gases emitted from the exhaust manifold are delivered through the pipes 14 successively into the suppression chambers 13a of the units 15a, 15b, 15c, in which the acoustic energy of the exhaust gases is suppressed, after which the exhaust gases are discharged into atmosphere.

The soft inner layer 17 of each casing 13 has an excellent ability, by itself, to absorb exhaust noise in a high frequency range in excess of about 250 Hz. Exhaust noise in a low frequency range below about 250 Hz is primarily attenuated by resonance in the suppression chambers 13a, as described later on.

Figure 3A:
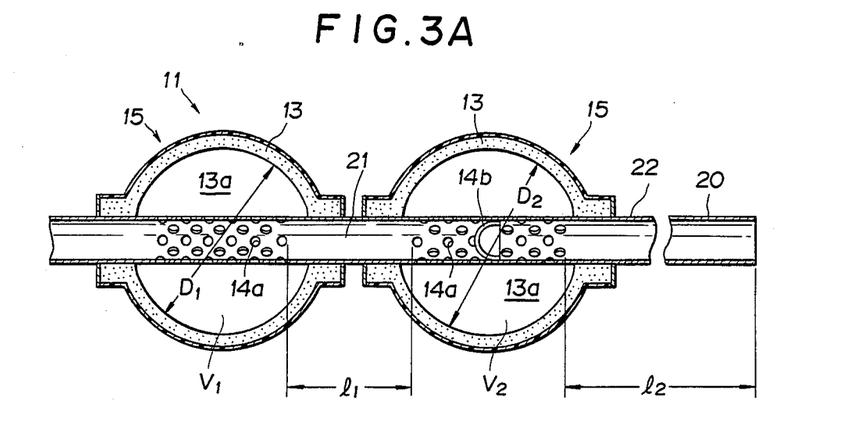
FIGS. 3A and 3B are cross-sectional views showing dimensions and relative positional relationship of component units.

FIG. 3A shows dimensions and relative positional relationship of two consecutive component units 15, the lefthand one of which is closer to the exhaust manifold. The component units 15 may be the component units 15a, 15b or the component units 15b, 15c. For theoretical explanation of the principles of the exhaust muffler, the pipes 14 of the components 15 are shown as a single linear pipe in FIG. 3A. Therefore, the angle $\theta 1$ or $\theta 2$ is 0 (zero). The following explanation has no bearing on the values of these angles $\theta 1$, $\theta 2$. Denoted at 14b is a partition in the pipe 20.

It is assumed here that the volume of one component unit 15 is V (cm³), the length of the outlet pipe of the component unit 15 is l (cm²), and the cross-sectional area of the outlet pipe of the component unit 15 is S (cm²). The "length of the outlet pipe" used above represents the length of a portion 21 or 22 of the pipe 20 which lies downstream of the unit 15 and which has no holes 14a in its peripheral wall. The exhaust vibration f (Hz) which is determined by the equation (1), below, is the theoretical resonant frequency of one component unit 15. Therefore, the component unit 15 resonantly attenuates exhaust noise at and below the frequency f, the noise being of a peak value at the frequency f.

$$f = (C/2\pi)\sqrt{S/l \cdot V} \tag{1}$$

where C is the speed of sound (cm/sec.) and indicated by $$C = 33,100 + 61 \cdot T \tag{2}$$

where T is the temperature (celsius).

Since the temperature of the exhaust muffler is increased up to about 600° C. at maximum, the speed of sound is below about 70,000 (cm/sec.). The transmission loss characteristics of the component unit 15 are solely determined if the values of the parameters V, l, S are given.

In FIG. 3A, the dimensions of the upstream component unit 15 and its outlet pipe 21 are selected as follows:

Diameter D1 of the spherical expansion chamber 13a =12.0 cm;

Length l1 of the outlet pipe 21=15.0 cm; and

Diameter d1 of the outlet pipe 21=4.03 cm.

The dimensions of the downstream component unit 15 and its outlet pipe 22 are selected as follows:

Diameter D2 of the spherical expansion chamber 13a =12.0 cm;

Length l2 of the outlet pipe 22=119 cm; and

Diameter d1 of the outlet pipe 22=4.03 cm

From the selected values of D1, l1, d1, D2, l2, d2, the volumes V1, V2 of the component units 15 and the cross-sectional areas S1, S2 of the outlet pipes 21, 22 can automatically be determined.

If the temperature T=277° C. and the speed of sound C=50,000 cm/sec., then $$(C/2\pi) \cdot \sqrt{(S1/l1 \cdot V1)} = 244 \tag{3}$$

$$(C/2\pi) \cdot \sqrt{(S1/l2 \cdot V2)} = 90.1 \tag{4}$$

If T=441° C. and C=60,000 cm/sec., then $$(C/2\pi) \cdot \sqrt{(S1/l1 \cdot V1)} = 293 \quad (5)$$

$$(C/2\pi) \cdot \sqrt{(S2/l2 \cdot V2)} = 108 \quad (6)$$

When the temperature T rises up to the upper limit of 600° C. and the speed of sound C is increased to the upper limit of 70,000 cm/sec., then $$(C/2\pi) \cdot \sqrt{(S1/l1 \cdot V1)} = 342 \quad (7)$$

$$(C/2\pi) \cdot \sqrt{(S2/l2 \cdot V2)} = 126 \quad (8)$$

Therefore, under normal conditions of use, the relationship:

$$(C/2\pi) \cdot \sqrt{(S1/l1 \cdot V1)} < 250 \quad (9)$$

is substantially maintained, and $$(C/2\pi) \cdot \sqrt{(S2/l2 \cdot V2)} < 250 \quad (10)$$

is always maintained. Therefore, the dimensions of the component unit 15 satisfy the following relationship:

$$(C/2\pi) \cdot \sqrt{(S1/l1 \cdot V1)} < 250 \quad (11)$$

$$\sqrt{(S/l \cdot V)} < 500\pi/C \quad (11')$$

Therefore, the component units 15 have mutually different resonant attenuation peaks in the low-frequency range below 250 Hz. As a consequence, exhaust noise in the low-frequency range is substantially uniformly attenuated by the resonant capability of the component units over the substantially entire range. However, an exhaust muffler may be constructed of a plurality of component units of identical dimensions.

The suppression chamber 13a functions as an expansion chamber to some extent. Accordingly, each of the component units 15 is effective in attenuating exhaust noise through three dampening functions of absorption, resonance, and sound absorption. A single component unit 15 may serve as a muffler.

Where a single component unit 15 is used to construct a muffler, it is necessary that the resonant attenuating range of the component unit 15 cover the entire low-frequency range below 250 Hz. In such an arrangement, the upstream component unit 15 shown in FIG. 3A should preferably be employed as a muffler.

The apertured portions (diffuser pipe portions) of the pipe 20 do not theoretically affect the resonant attenuation of exhaust noise. Thus, the component units 15 shown in FIG. 3A are functionally equivalent to the component units 15 shown in FIG. 3B in which the apertured portions of the pipe 20 are omitted from illustration.

Figure 4:
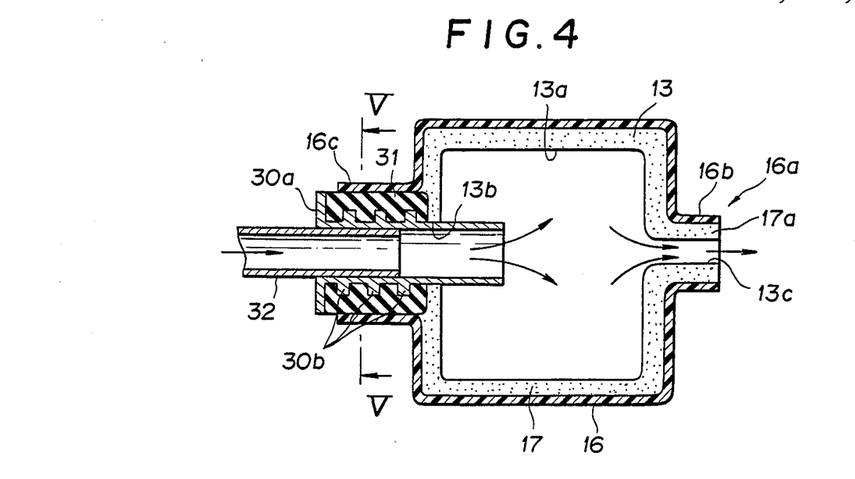
FIG. 4 is a cross-sectional view of a coupling by which a component unit is connected to the exhaust manifold of an internal combustion engine.

FIG. 4 shows the most upstream component unit 15a of the muffler 11. The casing 13 of the component unit 15a is constructed of two casing halves 113a, 113b (FIG. 5) joined together.

Figure 5:
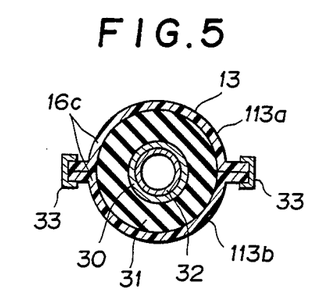
FIG. 5 is a cross-sectional view taken along line V—V of FIG. 4.

As illustrated in FIG. 5, the outer layer 16 of the casing 13 has a smaller-diameter cylindrical support 16c to be coupled to an exhaust manifold 32 upstream of the casing 13. The inner layer 17 has an insertion hole 13b defined therein concentric with the support 16c. In the support 16c, the casing halves 113a, 113b are additionally connected to each other by clamps 33. The outer layer 16 has a smaller-diameter cylindrical portion 16b projecting downstream of the casing 13 downstream of the casing 13 for insertion therethrough of the pipe 14. The inner layer 17 also has a smaller-diameter cylindrical portion 17a projecting downstream of the casing 13 coaxially with the cylindrical portion 16b and defining an exhaust outlet passage 13c therein. The cylindrical portions 16b, 17a jointly serve as a connector 16a, which may be vented directly to atmosphere or coupled to an exhaust outlet pipe, rather than another pipe.

A hollow cylindrical mouthpiece 30 is inserted in the insertion hole 13b in the inner layer 17. The mouthpiece 30 has a flange 30a on its upstream end and a helical ridge 30b on its outer peripheral surface. The exhaust manifold 32 has a downstream end inserted and welded in the mouthpiece 30.

Between the outer peripheral surface of the mouthpiece 30 and the inner peripheral surface of the support 16c, there is disposed a cylindrical bushing 31 made of a thermally insulative elastomeric material such as silicone rubber reinforced with inorganic fibers such as glass wool. The bushing 31 has front and rear end surfaces abutting against the rear surface of the flange 30a and the front surface of the inner layer 17. The outer peripheral surface and rear end surface of the bushing 31 are fixed respectively to the inner peripheral surface of the support 16c and the front surface of the inner layer 17.

Exhaust gases emitted from the internal combustion engine are introduced through the internal passages of the exhaust manifold 32 and the mouthpiece 30 into the suppression chamber 13a in the casing 13 in which the acoustic energy of the exhaust gases is suppressed. The exhaust gases then flow downstream through the outlet passage 13c. Vibration transmitted from the internal combustion engine to the component unit is reduced by the resiliency of the bushing 31. Therefore, any vibration of the casing 13 is suppressed, and the effect of such vibration on the inner layer 17 is reduced.

Figure 6A:
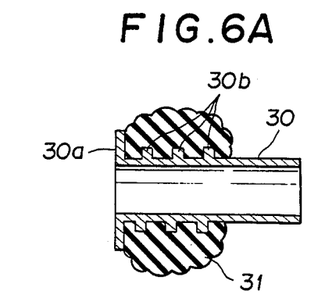
FIGS. 6A and 6B cross-sectional views of a connector which connects the component unit to the exhaust manifold.
Figure 6B:
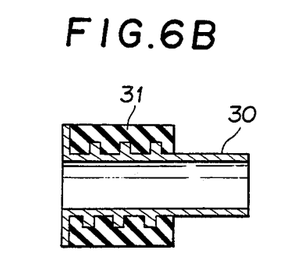

Before the exhaust manifold 32 is inserted and welded in position, the mouthpiece 30 is fabricated as shown in FIGS. 6A and 6B.

As shown in FIG. 6A, a mass 31 of silicone rubber including inorganic fibers before it is cured is applied around the mouthpiece 30. Then, the silicon rubber mass 31 is vulcanized in a mold into a shape as shown in FIG. 6B.

Instead of integrally forming the bushing 31 around the mouthpiece 30, a separately formed bushing may be threaded over or otherwise fixed to the mouthpiece 30 to provide a joined structure of the bushing 31 and the mouthpiece 30.

Figure 7A:
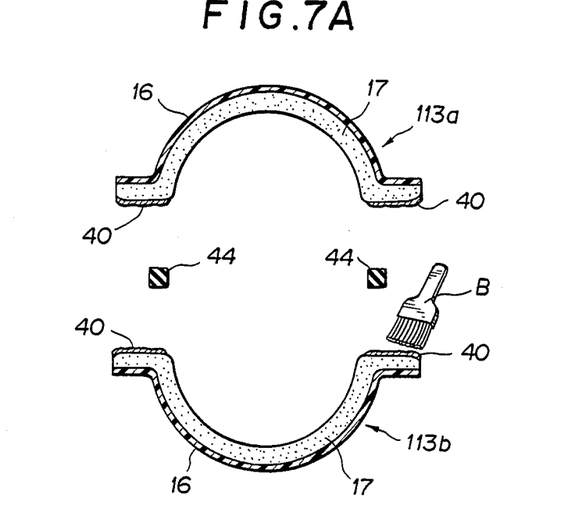
FIG. 7A and 7B are cross-sectional views showing a process by which the casing of a component unit is fabricated.

The casing halves 113a, 113b are joined to each other to construct the casing 13 and the component unit 15 in the following manner:

As illustrated in FIG. 7A, joint surfaces of the casing halves 113a, 113b are first coated with a bonding solution 40 of thermosetting resin by means of a brush B. Then, seal members 44 of heat-resistant rubber are positioned in inner regions between the casing halves 113a, 113b, after which the joint surfaces of the casing halves 113a, 113b are brought into abutment against each other.

The casing halves 113a, 113b thus held against each other are clamped under pressure between upper and lower dies 50, 51 in which heaters 52 are embedded. While the casing halves 113a, 113b are being clamped under pressure by the upper and lower dies 50, 51, the heaters 52 heat the bonding resin layers 40 through the dies 50, 51. The resin layers 40 are set to join the casing halves 113a, 113b thereby completing the casing 13. The seams of the joint surfaces positioned near the suppression chamber are sealed by the seal members 44.

As described above, the layers 17 of the casing halves 113a, 113b which will serve as the inner layer 17 of the casing 13 are formed of inorganic fibers compressed to shape or heat-resistant resin impregnated and partly set in inorganic fibers. Where the latter material is used, when the casing halves 113a, 113b are formed, the layers 17 are slowly pressed so as to be formed as partly set porous layers. The partly set porous layers 17 are then heat-set by clamping and heating the casing halves 113a, 113b as shown in FIG. 7.

Figure 7B:
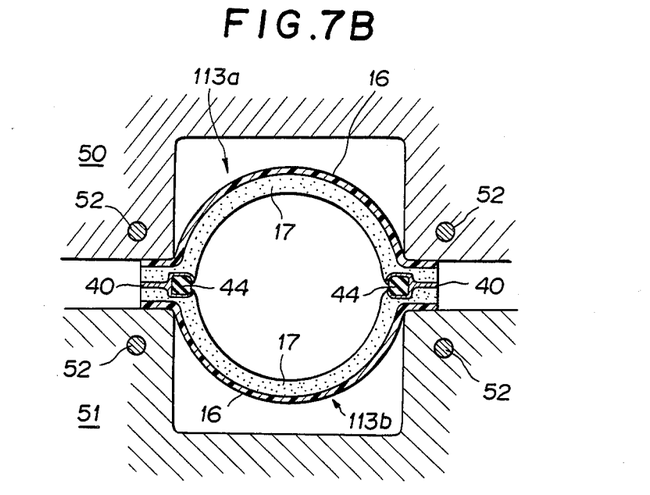

When fabricating the most upstream component unit 15a shown in FIG. 1, the combination of the mouthpiece 30 and the bushing 31 shown in FIG. 6B is sandwiched between the casing halves 113a, 113b before they are clamped under pressure as illustrated in FIG. 7B. When fabricating the intermediate component unit 15b or the most downstream component unit 15c shown in FIG. 1, the pipe 14 is sandwiched between the casing halves 113a, 113b before they are clamped under pressure as shown in FIG. 7B.

After the bonding thermosetting resin is coated on the joint surfaces of the partly set layers 17, the casing halves 113a, 113b are clamped under pressure while the bonding resin layers are being heated. Therefore, the casing halves 113a, 113b are joined to each other considerably strongly without being adversely affected by the surface roughness or other defects of the joint surfaces of the casing halves 113a, 113b. As a result, the component unit 15 is simple in structure and can highly efficiently be assembled without employing fastening members such as bolts or rivets.

Figure 8A:
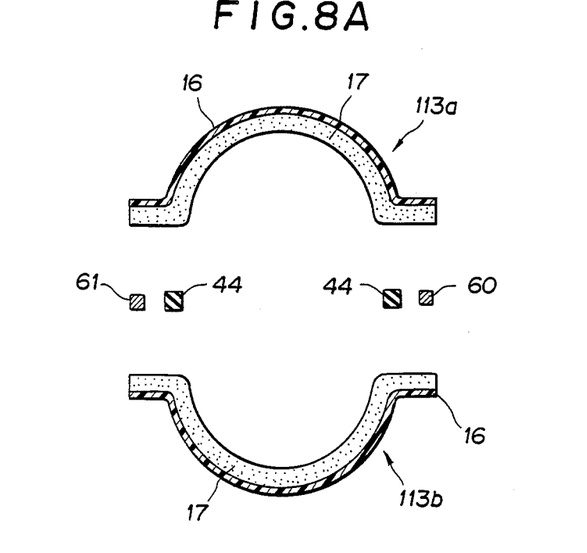
FIGS. 8A and 8B are cross-sectional views illustrating another process by which the casing of a component unit is fabricated.
Figure 8B:
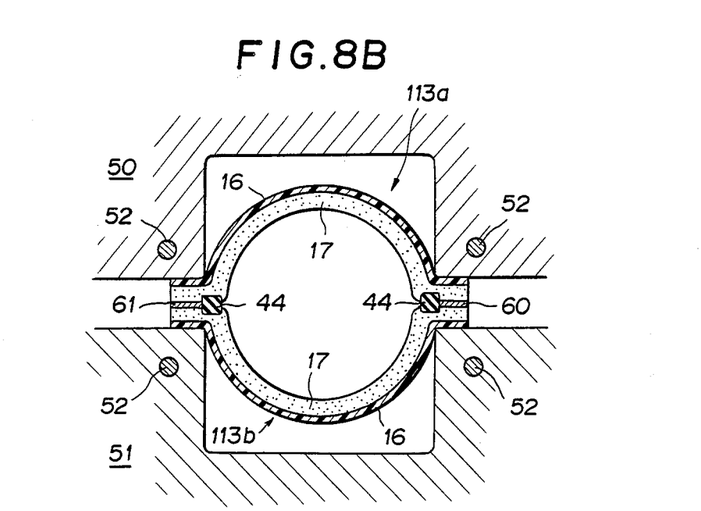

FIGS. 8A and 8B illustrate another process of fabricating a casing 13 of a component unit 15. As illustrated in FIG. 8A, mixtures (referred to as BCM) 60, 61 of glass fibers and thermosetting resin such as unsaturated polyester or the like are first positioned between the joint surfaces of casing halves 113a, 113b radially outwardly of seal members 44. Then, the joint surfaces are held against each other to deform the BCMs 60, 61 into flattened layers. Thereafter, as shown in FIG. 8B, the casing halves 113a, 113b are camped under pressure between upper and lower dies 50, 51, during which time the BCMs 60, 61 are heated by heaters 52 through the dies 50, 51. Consequently, the BCMs 60, 61 are heat-set to join the casing halves 113a, 113b to each other, perfecting the casing 13. The joining process shown in FIGS. 8A and 8B offers the same advantages as those of the joining process of FIGS. 7A and 7B.

Figure 9:
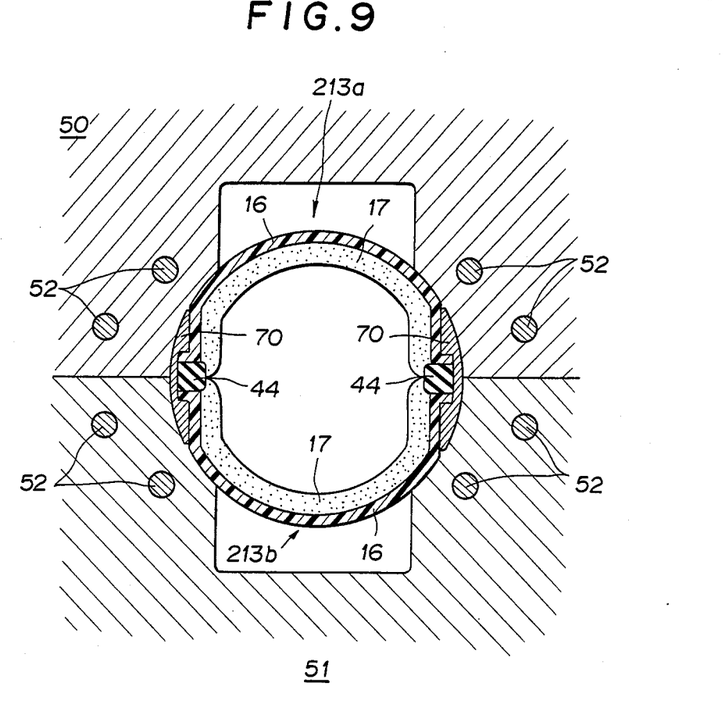
FIG. 9 is a cross-sectional view showing still another process by which the casing of a component unit is fabricated.

FIG. 9 illustrates still another process of fabricating a casing 13 of a component unit 15.

According to the fabricating process of FIG. 9, unset portions are first formed partly in outer layers 16 near the joint surfaces of casing halves 213a, 213b. Then, the casing halves 213a, 213b are brought into abutment against each other, and masses 70 of bonding thermosetting resin are applied to the unset portions of the casing halves 213a, 213b. Thereafter, as illustrated in FIG. 9, the casing halves 213a, 213b are clamped under pressure between upper and lower dies 50 51 while heating the bonding resin masses 70 with heaters 52 in the dies 50, 51. The thermosetting resin masses 70 are therefore heat-set to join the casing halves 213a, 213b to each other, whereupon a casing 13 is completed. The joining process shown in FIG. 9 also offers the same advantages as those of the joining process illustrated in FIGS. 7A and 7B.

Figure 10:
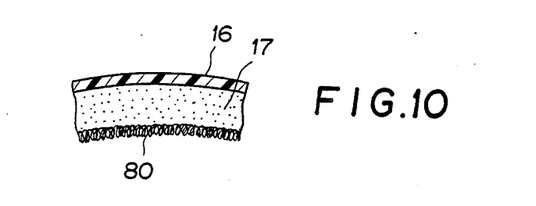
FIG. 10 is a fragmentary cross-sectional view of a modified wall structure of a component unit.

As shown in FIG. 10, a layer 80 of steel wool which has been compressed to shape may be additionally applied to the inner surface of the casing 13 to increase the heat transfer efficiency of the component unit 15.

The exhaust muffler 11 comprises a plurality of component units 15 each having a noise attenuating capability due to expansion, resonance, and absorption. Therefore, the volume V of the suppression chamber 13a of one component unit 15 may be made relatively small, i.e., the component unit 15 may be of reduced dimensions. As a result, the overall muffler 11 is reduced in dimensions and hence spaces in which the muffler 11 can be installed are selected with greater freedom. The angles $\theta_1$, $\theta_2$ at which the component units are connected can be suitably selected. Therefore, the muffler 11 can be installed in a space of a bent configuration as shown in FIG. 1. A small space around the internal combustion engine can thus be utilized for installation of the muffler 11, without imposing limitations on the positions where other accessories are located around the internal combustion engine.

The inner layer 17 of each of the component units 15 absorbs exhaust noise in the high-frequency range higher than above 250 Hz, and the dimensions of each component unit meet the inequality (11):

$$(C/2\pi) \cdot \sqrt{(S/l \cdot V)} < 250 \tag{11}$$

Exhaust noise in the low-frequency range lower than 250 Hz is effectively attenuated by resonance. Thus, exhaust noise in the high- and low-frequency ranges can effectively dampened without increasing the dimensions of the component units. The component units 15 can easily be designed inasmuch as they are of a simple configuration to which the simple resonance formula (1):

$$f = (C/2\pi) \sqrt{S/l \cdot V} \tag{1}$$

is applicable.

In the joining processes shown in FIGS. 7A, 7B, 8A, 8B, and 9, the joint surfaces of the molded resin bodies comprise partly set layers, between which bonding thermosetting resin layers are positioned. After the molded resin bodies have been held against each other, they are clamped under pressure while the bonding resin layers are being heated. Therefore, the molded resin bodies can be united to each other with large bonding strength without being adversely affected by the surface roughness or other defects of the joint surfaces of the molded bodies.

As illustrated in FIGS. 4, 5, 6A, and 6B, the outlet end of the exhaust manifold is coupled to the most upstream component unit 15a through the elastomeric bushing 31. Accordingly, any exhaust vibration transmitted to the casing 13 is dampened by the bushing 31.

Since the exhaust manifold is coupled to the muffler 11 only by the mouthpiece 30 and the bushing 31, the coupling structure is simple, the number of parts used by the coupling structure is reduced, and the component units can easily be assembled.

Figure 3B:
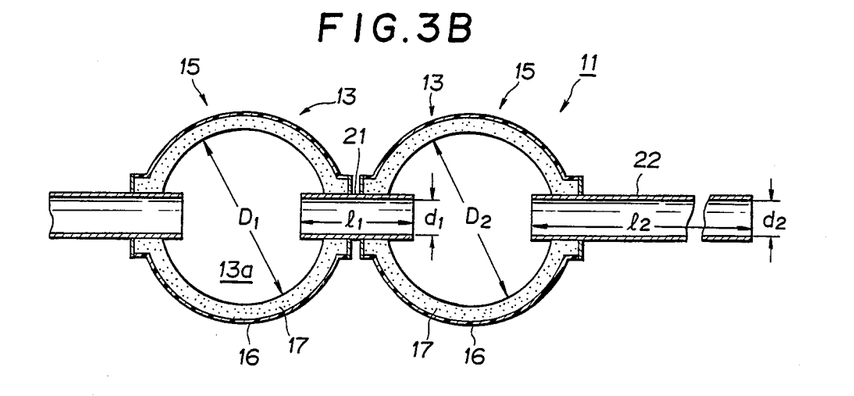

Each of the component units 15 is constructed as shown in FIG. 2. However, the combination of one of the casings 13 and its downstream pipe portion 21 or 22 as shown in FIG. 3B may be regarded as one component unit.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. An exhaust muffler having a plurality of component units connected in series with each other by a connector pipe, said connector pipe having at least one inlet end for receiving exhaust gases from an internal combustion engine, and at least one outlet end vented to atmosphere;

each of said component units having a casing defining an internal suppression chamber therein and having an inner layer of a sound-absorbing material which defines said internal suppression chamber, said connector pipe passing through each casing and having upstream and downstream ends projecting out of said casing, the downstream end of the connector pipe of the upstream component of said connector pipe passing through each casing and having eam and downstream ends projecting out of said casing, the nstream end of the connector pipe of the upstream component of said components connected in series being connected to the upstream end of the connector pipe of the following downstream component of said components connected in series, said connected connector pipes holding said casing component units in communication in series with each other;

said connector pipe having at least one opening which opens into said internal suppression chamber in each of said casing component units;

said connector pipe of the most upstream one of said casing component units having an upstream portion serving as said at least one inlet pipe; and said connector pipe of the most downstream one of said casing component units having a downstream end vented to the atmosphere;

said connector pipes of said component units jointly serving as a single main exhaust pipe; at least one of said component units being constructed to meet:

$$\sqrt{(S/l \cdot V)} < 500\pi/C$$

where V is a volume of said internal suppression chamber, l and S are an effective pipe length of and cross-sectional area of a flow passage in said connector pipe extending from the internal suppression chamber of said at least one of the component units to one of the internal suppression chamber of the next component unit and the end vented to the atmosphere, and C is speed of sound.

2. An exhaust muffler having a plurality of component units connected in series with each other by a connector pipe, said connector pipe having at least one inlet end for receiving exhaust gases from an internal combustion engine, and at least one outlet end vented to atmosphere;

each of said component units having a casing defining an internal suppression chamber therein and having an inner layer of a sound-absorbing material which defines said internal suppression chamber, said connector pipe passing through each casing and having upstream and downstream ends projecting out of said casing, the downstream end of the connector pipe of the upstream component of said components in series being connected to the upstream end of the connector pipe of the following downstream component of said components connected in series, said connected connector pipes holding said casing component units in communication in series with each other;

each of said casing comprising a pressure heated mass of thermosetting resin having partly set joint portions forming at least two separate bodies;

bonding members of thermosetting resin sandwiched between said partly set joint portions and holding said separated bodies against each other:

said separate bodies being clamped together under pressure and integrally heat bonded to each other with said bonding members and said partly set portions;

said connector pipe having at least one opening which opens into said internal suppression chamber in each of said casing component units;

said connector pipe of the most upstream one of said casing component units having an upstream portion serving as said at least one inlet pipe; and said connector pipe of the most downstream one of said casing component units having a downstream end vented to the atmosphere;

said separate bodies being bonded to each other with seal members of a heat-resistant rubber material sandwiched between said partly set joint portions.

3. An exhaust muffler comprising:

a plurality of suppression casings identical in shape to each other and having inner walls of a sound-absorbing material which define internal suppression chambers, respectively, for introducing exhaust gases therein:

an inner layer defining said internal suppression chamber for attenuating, by absorption, exhaust noises in a frequency higher than about 250Hz;

a single communication pipe extending through said internal suppression chambers of said suppression casings and having an upstream end to be connected to an internal combustion engine and a downstream end vented to atmosphere, said communication pipe having at least one opening in each of said internal suppression chambers of said suppression casings;

said suppression chambers being connected in series by said communication pipe;

said exhaust muffler being constructed to meet:

$$\sqrt{(S/l \cdot V)} < 500\pi/C$$

where V is a volume of said internal suppression chamber, l and S are an effective pipe length of and cross-sectional area of a flow passage in said outlet pipe, and C is a speed of sound.

4. An exhaust muffler having a plurality of component units connected in series with each other by a connector pipe, said connector pipe having at least one inlet end for receiving exhaust gases from an internal combustion engine, and at least one outlet end vented to atmosphere;

each of said component units having a casing defining an internal suppression chamber therein and having an inner layer of a sound-absorbing material which defines said internal suppression chamber, a layer of compressed steel wool applied to an inner surface of said inner layer, said connector pipe passing through each casing and having upstream and downstream ends projecting out of said casing, the downstream end of the connector pipe of the upstream component of said components connected in series being connected to the upstream end of the connector pipe of the following downstream component of said components connected in series, said connected connector pipes holding said casing component units in communication in series with each other;

said connector pipe having at least one opening which opens into said internal suppression in each of said casing component units;

said connector pipe of the most upstream one of said casing component units having an upstream portion serving as said at least one inlet pipe; and said connector pipe of the most downstream one of said casing component units having a downstream end vented to the atmosphere;

said connector pipes of said component units jointly serving as a single main exhaust pipe; at least one of said component units being constructed to meet:

$$\sqrt{(S/l \cdot V)} < 500\pi/C$$

where V is a volume of said internal suppression chamber, l and S are on effective pipe length of and cross-sectional area of a flow passage in said connector pipe extending from the internal suppression chamber of said at least one of the component units to one of the internal suppression chamber of the next component unit and the end vented to the atmosphere, and C is a speed of sound.

5. An exhaust muffler having a plurality of component units connected in series with each other by a connector pipe, said connector pipe having at least one inlet and end for receiving exhaust gases from an internal combustion engine, and at least one outlet end vented to atmosphere;

each of said component units having a casing defining an internal suppression chamber therein and having an inner layer of a sound-absorbing material which defines said internal suppression chamber, said connector pipe passing through each casing and having upstream and downstream ends projecting out of said casing, the downstream end of the connector pipe of the upstream component of said components connected in series being connected to the upstream end of the connector pipe of the following downstream component of said components connected in series, said connected connector pipes holding said casing component units in communication in series with each other;

said connector pipe having at least one opening which opens into said internal suppression chamber in each of said casing component units;

said connector pipe of the most upstream one of said casing component units having an upstream portion serving as said at least one inlet pipe; and said connector pipe of the most downstream one of said casing component units having a downstream end vented to the atmosphere;

said most upstream one of said component units having a thermally insulative elastomeric member into which said upstream portion of said pipe of said most upstream component unit is inserted.

6. An exhaust muffler according to claim 5, wherein said elastomeric member is fixed to each of a most upstream portion of said connector pipe and said casing.

* * * * *